(12) United States Patent
Jones et al.

(10) Patent No.: US 8,006,069 B2
(45) Date of Patent: Aug. 23, 2011

(54) INTER-PROCESSOR COMMUNICATION METHOD

(75) Inventors: Simon Jones, London (GB); Carl Norman Graham, London (GB); Kar-Lik Wong, Wokingham (GB)

(73) Assignee: Synopsys, Inc., Mountain View, CA (US)

( * ) Notice: Subject to any disclaimer, the term of this patent is extended or adjusted under 35 U.S.C. 154(b) by 991 days.

(21) Appl. No.: 11/973,173

(22) Filed: Oct. 5, 2007

(65) Prior Publication Data

US 2008/0086626 A1   Apr. 10, 2008

Related U.S. Application Data

(60) Provisional application No. 60/849,443, filed on Oct. 5, 2006.

(51) Int. Cl.
    G06F 15/76    (2006.01)
    G06F 15/80    (2006.01)

(52) U.S. Cl. .............................. 712/34; 712/32; 712/225

(58) Field of Classification Search ............... 712/11, 712/22, 31, 34, 35, 36, 225
See application file for complete search history.

(56) References Cited

U.S. PATENT DOCUMENTS

| | | |
|---|---|---|
| 5,428,760 A | 6/1995 | Ghori et al. |
| 5,440,749 A | 8/1995 | Moore et al. |
| 5,526,487 A | 6/1996 | Schiffleger |
| 5,826,105 A | 10/1998 | Burstein et al. |
| 5,848,276 A | 12/1998 | King et al. |
| 5,913,059 A * | 6/1999 | Torii .............................. 718/104 |
| 5,953,741 A | 9/1999 | Evoy et al. |
| 6,128,311 A * | 10/2000 | Poulis et al. .................. 370/463 |
| 6,219,740 B1 | 4/2001 | Mabuchi et al. |
| 6,327,650 B1 | 12/2001 | Bapst et al. |
| 6,505,290 B1 | 1/2003 | Moyer et al. |
| 6,643,763 B1 | 11/2003 | Starke et al. |
| 6,760,888 B2 * | 7/2004 | Killian et al. ................. 716/102 |
| 6,944,746 B2 * | 9/2005 | So .................................... 712/34 |
| 7,020,854 B2 * | 3/2006 | Killian et al. ................. 716/102 |
| 2001/0003834 A1 | 6/2001 | Shimonishi |
| 2003/0051124 A1 | 3/2003 | Dowling |

(Continued)

FOREIGN PATENT DOCUMENTS

EP    0 389 001 B1    9/1990

(Continued)

OTHER PUBLICATIONS

Hauck et al, "The Chimaera Reconfigurable Functional Unit," Field-Programmable Custom Computing Machines, 1997. Proceedings., The 5th Annual IEE Symposium on Napa Valley, Ca., Apr. 16-18, 1997, pp. 87-96.

*Primary Examiner* — Aimee J Li (74) *Attorney, Agent, or Firm* — Fenwick & West LLP (57) ABSTRACT

Inter-processor communication systems and methods that define within the instruction set of the microprocessor a command for directing the microprocessor to relinquish control over at least one of the microprocessor's internal registers. The microprocessor may then signal a communication interface that collects data from external sources. The communication interface takes control over the internal register released by the microprocessor and inputs the collected external data directly into the internal register of the microprocessor. Once data is place into the internal register, control of that register may be returned to the microprocessor.

24 Claims, 5 Drawing Sheets

U.S. PATENT DOCUMENTS

| | | |
|---|---|---|
| 2003/0088610 A1 | 5/2003 | Kohn et al. |
| 2003/0185298 A1* | 10/2003 | Alvarez et al. ............ 375/240.03 |
| 2003/0188127 A1* | 10/2003 | So ................... 712/34 |
| 2003/0208723 A1* | 11/2003 | Killian et al. ...................... 716/1 |
| 2004/0024988 A1 | 2/2004 | Chauvel et al. |
| 2004/0117598 A1 | 6/2004 | Arimilli et al. |
| 2004/0215929 A1 | 10/2004 | Floyd et al. |
| 2004/0221212 A1 | 11/2004 | Ando |
| 2004/0250231 A1* | 12/2004 | Killian et al. ................... 716/18 |

FOREIGN PATENT DOCUMENTS

| | | |
|---|---|---|
| EP | 0 546 354 B1 | 6/1993 |
| WO | WO-01/67237 A2 | 9/2001 |

\* cited by examiner

INTER-PROCESSOR COMMUNICATION METHOD

This Application claims the benefit of U.S. Provisional Application Ser. No. 60/849,443, filed Oct. 5, 2006, the entire contents of which are incorporated herein by reference.

FIELD OF INVENTION

The systems and methods described herein relate in general to microprocessor architecture and more specifically to an inter-processor communication (IPC).

BACKGROUND OF THE INVENTION

Where a microprocessor forms part of a system it is common practice for an external device to interrupt the microprocessor program flow, and to have the microprocessor service the interrupt. Examples of such interrupt systems are discussed in U.S. Pat. No. 4,349,873.

Typically, the microprocessor receives the interrupt signal and when the microprocessor completes the current instruction, the microprocessor jumps directly or indirectly to a routine to service the interrupt. Once the interrupt is serviced, the microprocessor may return to its earlier program thread and continues to execute that thread. Although the above described interrupt process is effective and popular, it does have several drawbacks—due to the need to complete the current instruction or software task, the time between reception of an interrupt signal and servicing the response can vary, and a significant number of machine cycles may occur before the interrupt is serviced. Interrupt response times may vary, due to factors such data cache misses or instruction cache misses caused by the main computer program. A significant number of machine cycles are usually required to perform context switching to ensure integrity of the main program.

Additionally, if a microprocessor is waiting for an external signal, for example when the microprocessor is performing a loop, it consumes power while doing so.

This idle time may be relatively long as there can be significant overhead when servicing an interrupt. This is particularly true if the microprocessor is to ensure that a temporary data storage area is provided and that data transfer is synchronised so that data is not read before being stored, or overwritten before being read.

Further, this traditional approach to handling interrupt does not work well with more modern techniques for improving microprocessor speed and efficiency. For example, Microprocessors today often have a branch prediction mechanism to minimise the overhead incurred by branches in normal program flow. External interrupts often compromise the prediction mechanism due to their highly unpredictable nature.

Accordingly, there is a need in the art for improved techniques for handling interprocessor communications.

SUMMARY OF THE INVENTION

The systems and methods described herein, include, among other things, methods for inter-processor communications, including methods that define within the instruction set of the microprocessor a command for directing the microprocessor to relinquish control over at least one of the microprocessor's internal registers. The microprocessor may then signal to a communication interface that is built into the microprocessor. The communication interface collects data from external devices. These external devices can be any source of data and typical examples will include analog-to-digital converters, sensors and specialized processing chips like a codec or a digital signal processor. The communication interface can fetch data from the external device, or it may buffer it or otherwise store it but either way the communication interface collects data from an external source, and takes control over the internal register released by the microprocessor to input the collected external data directly into the internal register of the microprocessor. Once data is place into the internal register, control of that register may be returned to the microprocessor.

More particularly, the systems and methods described herein, provide an IPC method to transfer externally communicated data directly into a microprocessor's registers. For example, such data may be directly transferred to the microprocessor's program counter to change the program flow on the microprocessor and/or such data may be directly transferred to the microprocessor's general-purpose registers. Such a microprocessor, described herein as a receiving unit, runs a program where the program executes a communications receive command. When a communications receive command is executed and externally communicated data is not yet available, the microprocessor sets itself into a stalled state where optionally, portions of its circuitry halts operations and ceases to be clocked. When a communications receive command is executed and externally communicated data is already available to the receiving unit, the externally communicated data is used immediately and the microprocessor optionally does not set itself into a stalled state. When the receiving unit uses externally communicated data, additional communications interface circuitry may allow the externally communicated data to be written directly into one or more of the microprocessor's registers. Such data may form part of the input to subsequent computation, and/or an address for a subsequent program jump for example. Such externally communicated data may also include a restart instruction that will cause the microprocessor to execute instructions again. The communications interface may, after completion of reception and storage of externally communicated data, cause the microprocessor to execute instructions again.

For event-driven software architectures the IPC method described herein may use substantially fewer machine cycles, providing response times significantly lower than those associated with existing interrupt methods (for example by removing the need for context switching). In addition, the methods described herein provide a means for a microprocessor to accept external data or interruptions at precise specific points within the microprocessor's instruction stream.

The IPC method may also require reduced power consumption because the microprocessor does not need to be clocked when waiting for and during external data communications. Further, the IPC may also provide an unlimited number of communications service routines as each set of externally communicated data may send a different branch address.

In a typical pipelined processor with branch prediction capability, the branch mechanism provided by the IPC methods described herein separate the highly unpredictable branches that are driven by external events and prevent them from polluting the branch prediction unit. This allows the branch prediction unit to focus on branches in the main program the processor is running. This improves overall performance in applications using algorithms that are highly adaptive to the data being processed.

Additionally, the IPC methods described herein transfer data from an external unit (described herein as a sending unit)

directly, without requiring the use of general purpose temporary data storage and its associated data transfer synchronisation mechanism.

Embodiments and applications are described by way of example only and persons skilled in the art will know that there are many alternative ways to embody the present invention and many alternative ways to apply the method of the present invention.

BRIEF DESCRIPTION OF DRAWINGS

The foregoing and other objects and advantages of the invention will be appreciated more fully from the following further description thereof, with reference to the accompanying drawings wherein.

DETAILED DESCRIPTION

The invention will now be described with reference to certain embodiments that are provided for the purpose of illustration, and are not to be deemed limiting in any way. The exemplary systems and methods described herein, include, among other things, systems and methods for inter-processor communications. For the purpose of clarity these systems and methods will be described with reference to microprocessors that have one or more internal registers and that have been configured to have an instruction set that includes a command for directing the microprocessor to relinquish control over at least one of the microprocessor's internal registers and to allow a communication interface circuit, built into the structure of the microprocessor to collect data from an external source and to input the collected data directly into the internal register of the microprocessor.

However, these described embodiments are merely for the purpose of illustration and it will be understood that other embodiments of the invention may be realized. For example, the invention is described below with reference to microprocessors that receive data from an external source. However, it will be understood that the systems and methods described herein may be applied to micro-controllers, digital signal processors, filed programmable gate arrays and other types of programmable devices. Additionally, the devices described herein may have additional inter-process communication systems, such as interrupt based communication systems that can work in concert with the inter-process communication systems described herein.

Figure 1A:
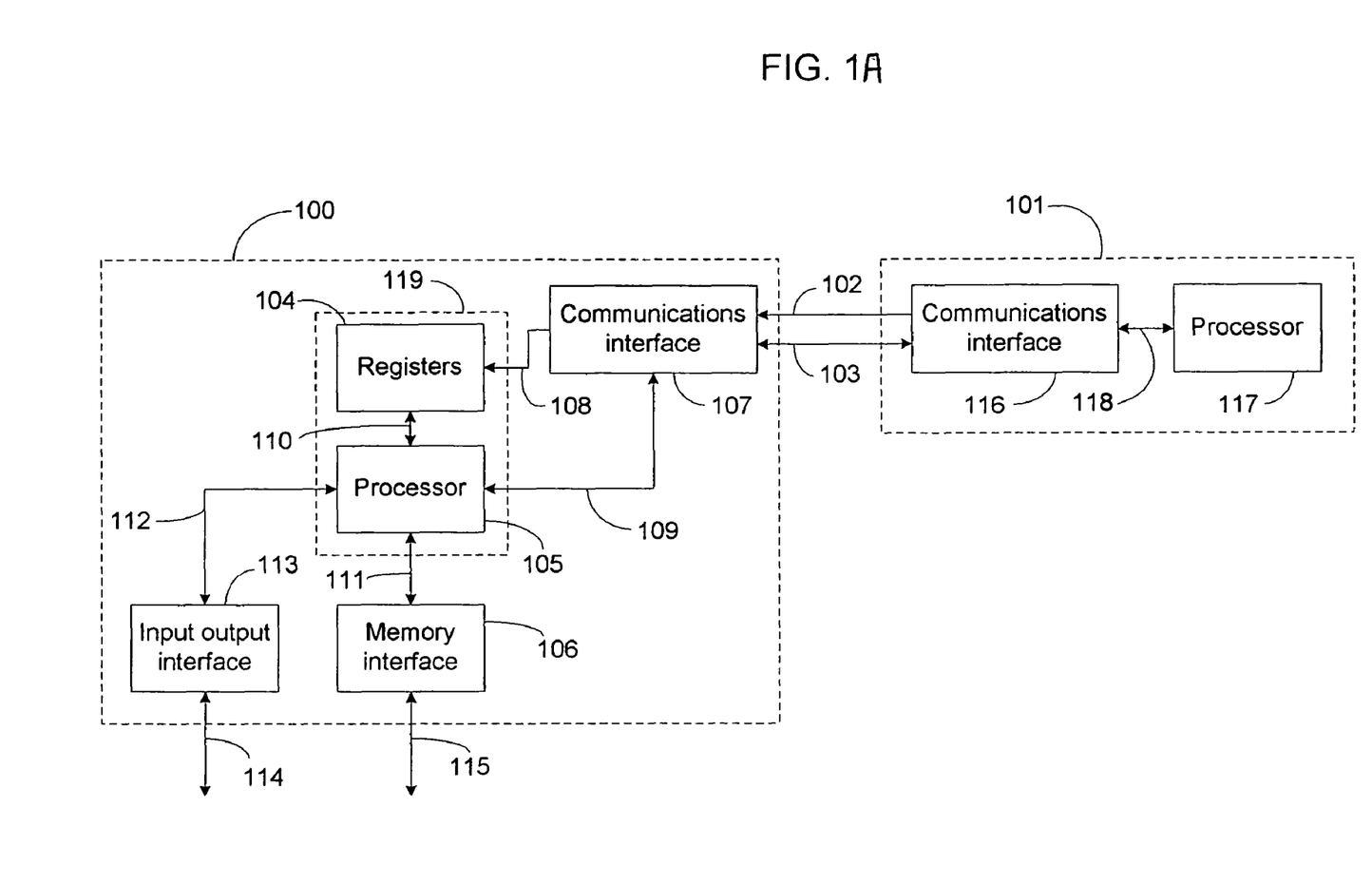
FIG. 1A illustrates one embodiment of an IPC system according to the invention.

Turning to the illustrated embodiments, FIG. 1A shows one embodiment of a microprocessor that has an IPC system according to the invention. The depicted IPC system includes a receiving unit communicating with a sending unit. Receiving unit 100 receives data via data signals 102 from sending unit 101 where such data communication is controlled via control signals 103.

Receiving unit 100 includes registers 104, processor 105, memory interface 106, input output interface 113 and communications interface 107. The processor typically includes an arithmetic and logic unit (ALU) and mechanisms to control fetching and executing instructions of a computer program that represents the main stream or thread being processed by the microprocessor. These processor control mechanisms typically include registers for temporary data storage, however for the purposes of clarity, one or more of these processor registers are shown in separate block 104 and the dotted box 119 emphasizing that registers 104 are associated with processor 105.

The processor, registers, memory interface and input output interface may comprise a CPU (central processing unit) of known type and persons skilled in the art will know that these may form any one of for example CPU, DSP (digital signal processor), microprocessor, microcontroller, and state machine. For clarity not all signal paths are shown. The input output unit 113 may or may not be present and if present may comprise one or more of serial, parallel or interrupt interfaces. The communications interface 107 enables the IPC method. The processor communicates with the internal registers via signals 110, and with the memory interface via signals 111, with the input/output interface via signals 112 and with the communications interface 107 via signals 109. The processor runs a program executing a sequence of instructions and persons skilled in the art will know that this may involve instructions and data being fetched from external memory (not shown) via signals 115 that represent an external data path or data connection to a data storage device, such as a RAM chip that is physically separate from the receiving unit 100. and may include external data being received or transmitted via signals 114. When the processor runs its program it communicates with the internal registers to store or retrieve working data, to retrieve instructions, or to update or retrieve the program counter for example. The registers 104 may include one or more of general-purpose registers, instruction decode registers, instruction cache registers, instruction pipeline registers, program counter register, data cache registers, data pipeline registers or auxiliary data storage registers for example. When the processor is executing general program instructions (i.e. instructions that do not receive external communications from a sending unit), the processor via control signals 109 controls the communications interface such that the communications interface does not communicate with the registers.

Sending unit 101 includes processor 117 and communications interface 116. Sending unit 101 may additionally and optionally comprise for example one or more of (not shown for clarity) registers, memory interface, input/output interface communicating with processor 117. Processor 117 may comprise a general processor or application-specific hardware and may comprise one or more of CPU, microprocessor, microcontroller, single instruction multiple data (SIMD) unit, DSP, state machine, co-processor or other hardware-processing block for example. The processor 117 communicates with the communications interface via signals 118.

Processor 105 in receiving unit 100 will process its program by executing instructions. In one embodiment, the instruction set of the processor 105 includes a "communication receive" instruction, which in one example is the instruction "chex" which actually stands for 'channel execute' and there are no variables. In cases where multiple channels may be sending data, the instruction may include a variable representing the channel to given control over the internal registers. When the processor 105 executes the communications receive instruction the processor 105 relinquishes control over one or more of the registers 104. When the processor 105 relinquishes control over the registers, it signals to the communications interface 107 that the communications interface now has control over the registers. When the communications interface has control over the registers it will have control over at least one of the registers within registers 104. When the communications interface 107 has control over the registers it waits for a communications input from a sending unit 101. When no such input is available, the processor 105 may set itself into a stalled state while waiting for it. Logic associated with the instruction decoder would upon decoding of a comms-receive command, cause the instruction execution process to stop, as well as optionally signalling to the comms-interface that registers are relinquished. When the processor 105 is in a stalled state it ceases instruction fetching and execution and may consume virtually no power if circuitry associated with instruction fetching and execution is not clocked.

When sending unit 101 needs to send data to receiving unit 100, processor 117 communicates via signals 118 with communications interface 116 and the relevant sequence of communications to the receiving unit 100 is initiated. The data for such communications from sending unit 101 to receiving unit 100 is sent via signals 102 and control signals 103 conform to a communications protocol such that data is only sent when ready to be received. When communications interface 107 in receiving unit 100 receives data from the sending unit 101 and when communications interface 107 has control over one or more of the registers 104, the communications interface 107 writes data into one or more registers within registers 104 via signals 108. The signals 108 in the depicted embodiment may be a data connection that provides an internal path for data to be passed between the communication interface 107 and one or more of the internal registers 104. In one embodiment, the internal data path 108 may be a serial or parallel data path formed on the silicon substrate that includes the communications interface 107 and the processor 105 and internal registers 104. In other embodiments, the path 108 may exist between a communication interface 107 and a register 104 that are physically separated, however the path 108 is a direct path as it avoids having to pass through the memory interface 106 to collect data from an external device. In the depicted embodiment, the signal 108 is shown as delivering data from the communication interface 107 to the registers 104. However, in other embodiments, the path may be bi-directional allowing for two-way data communication between the internal registers 104 and the communications interface 107.

When communications interface 107 has written the data into one or more of the registers 104 the communications interface 107 may receive further data from the sending unit 101. In each case, data sent from the sending unit 101 may be interpreted by the receiving unit 100 as data and/or a command. Such commands are interpreted by the communications interface 107. To that end, the communication interface 107 may include program logic for decoding the data received from the sending unit to determine whether the data is representative of a command. For example, the communication interface 107 may include program logic to respond to data representative of a command to store into a specific one of register 104, the next byte received from the sending unit 101. When the sending unit 101 completes a sequence of data transfers, the sending unit 101 may send a restart command that may be decoded and processed by the communication interface 107 and/or the communications interface 107 may include program logic such that when a communication is completed and after the action associated with the communicated data is completed (such as the storage of data in registers 104), the communications interface 107 acts as if it had received a restart command. When communications interface 107 acts as if it had received a restart command or receives a restart command, the communications interface relinquishes control of registers 104 and signals to processor 105 via signals 109, that the processor is to resume executing instructions.

During communications between the sending unit 101 and the receiving unit 100, the processor's 105 program counter register may have been loaded with an address pointing to a direct communications service routine. In this way, once processor 105 restarts, it will start executing instructions from the direct communications service routine. The direct communications service routine may or may not make use of data communicated from the sending unit 101 to the receiving unit 100 and stored in working registers within registers 104 for example. The sequence described above as occurring after communications interface 107 receives a restart command is given by way of example only and other possibilities exist such as processor 105 continuing its instruction sequence or jumping to an alternative place in the program. A further example is where a sending unit sends an address for a direct communications service routine without any accompanying data, and in such cases processor 105 may then operate on data stored in external memory accessed via signals 115. When processor 105 reaches the end of a direct communications service routine, the last instruction may be a program jump so that the processor carries out other program tasks or the last instruction may be a communications receive command which may return the processor to the stalled state making the receiving unit ready to receive further communications from the sending unit.

An important advantage of the systems described herein is the low overhead involved in communicating data from the sending unit to the receiving unit. Without this invention, the sending unit 101 would typically have to store the data to be communicated somewhere accessible by the receiving unit 100. The receiving unit would then have to read the data, for example via the memory interface 106 or the input output interface 113. Additionally, some synchronisation mechanism would be required to ensure the sending unit stores the data concerned to the specified location before the receiving unit attempts to read from it and that the data is not overwritten before it is actually read by the receiving unit. Such overhead is eliminated by the described systems, allowing the sending unit to send the data directly via the communication interface 116 and by allowing the communication interface 107 to write such data directly to the registers 104.

Figure 8:
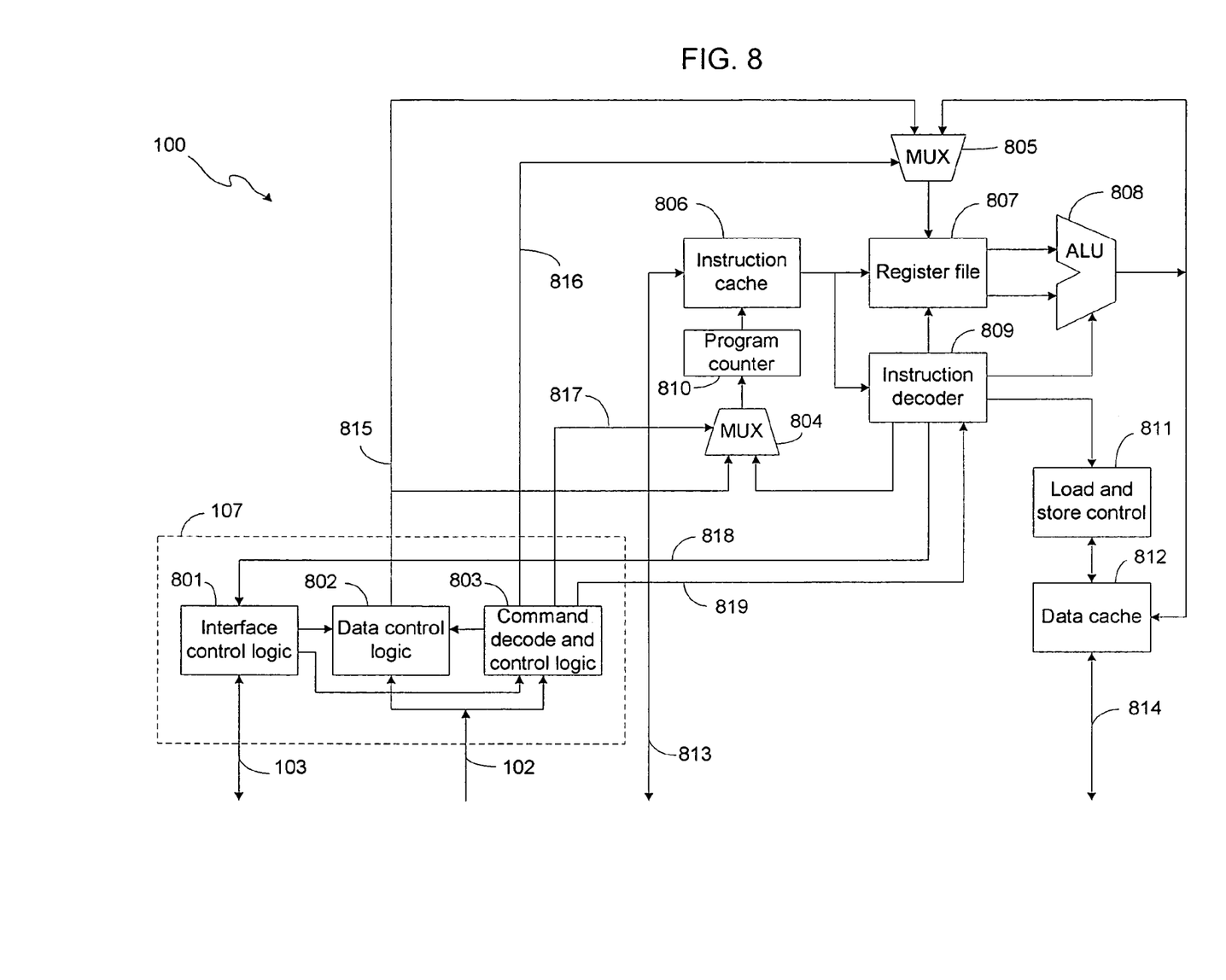
FIG. 8 depicts in more detail a block diagram of one embodiment of a receiving unit according to the invention.

Another advantage of the systems described herein is the branch mechanism it triggers can be isolated from the branch prediction mechanism of the processor. In a typical high performance pipeline processor, branch prediction is employed to minimise the overhead incurred by branches in a normal program flow. Branch prediction is typically based on recent branch history and is effective only if the branches follow some repetitive patterns, in which case the branches are described as predictable. In an event-driven system, branch behaviour is often data dependent and is highly unpredictable. Unpredictable branches are not only difficult to predict, they also corrupt the branch history and make other repetitive branch patterns difficult to detect. The overall negative impact on performance can be significant. By allowing the IPC mechanism to write directly to the program counter, the present invention allows such highly unpredictable branches to be isolated from the processor branch prediction scheme and eliminates the negative impact on performance described above. This is shown in FIG. 8 where the externally communicated data 815 for the program counter is routed to the program counter 810 via multiplexer 804.

Referring again to FIG. 1A. Sending unit 101 may send a communication to receiving unit 100 during the time that processor 105 is executing instructions and therefore communications interface 107 will not have control over registers 104. In such cases, communications interface 107 may receive the communication from the sending unit and signal via control signals 103 that the receiving unit is busy. If the sending unit receives a busy signal it will not send further communications until the busy status changes. Communications interface 107 may store the communicated data and wait until processor 105 executes a communications receive instruction, which would then enable communications interface 107 to complete the communications data transfer to registers 104. Communications interface 107 may then change the status of the busy signal allowing further communications from the sending unit.

If receiving unit 100 is waiting for communications from sending unit 101 and processor 105 is in the stalled state, a situation may occur where a communication from the sending unit fails to arrive and at such times the system is in a deadlocked state. An example method to get a system out of such a deadlocked state is where communications timeout circuitry is added to the receiving unit or to the sending unit such that after a predetermined time after communication inactivity, the communications timeout circuitry will cause communications interface 107 to operate as if it had received a restart command.

In certain embodiments it may be desirable for sending unit 101 to be able to read the contents of registers 104 in receiving unit 100. In such an embodiment communications interface 116 and communications interface 107 will be adapted such that register read commands may be sent to communications interface 107. When communications interface 107 has control over registers 104 and it receives a register read command, it will read the value in the relevant register within registers 104 and present the value on data signals 102 thereby enabling communications interface 116 to read the register data (data signals path 102 will become two-way in this embodiment).

In certain embodiments sending unit 101 may comprise two or more communications interface 116 where each additional communications interface is controlled by processor 117. Each communications interface may communicate with a separate receiving unit 100.

In certain embodiments receiving unit 100 may additionally comprise one or more sending unit communications interface 116 where each sending unit communications interface is controlled by processor 105. Each sending unit communications interface may communicate with a separate receiving unit 100. In such an embodiment, the receiving unit may act as either a receiving unit or a sending unit at different times.

Figure 1B:
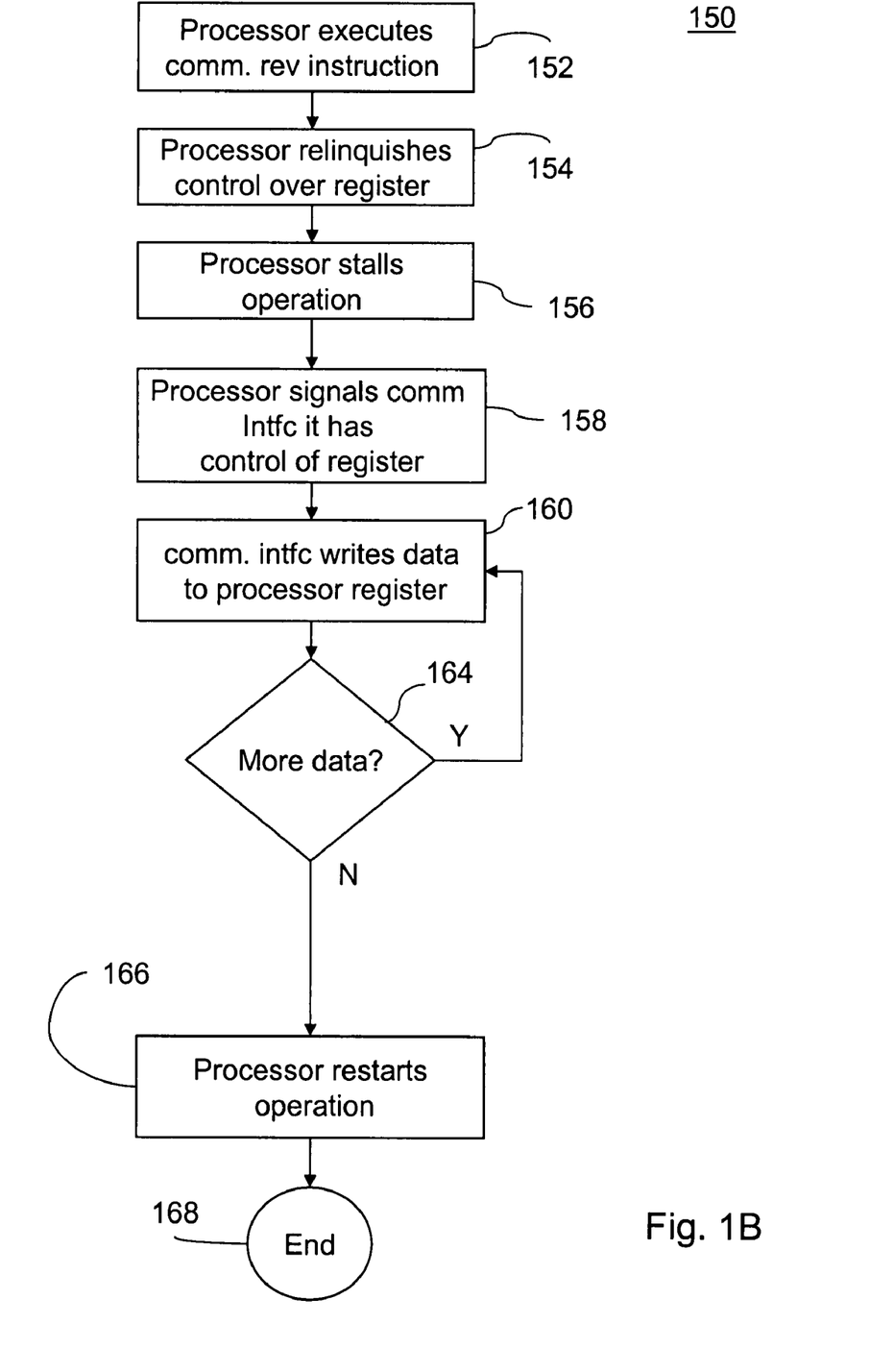
FIG. 1B depicts flow chart of a process for IPC using a system such as the system depicted in FIG. 1A.

FIG. 1B depicts flow chart of a process 150 for IPC using a system such as the system depicted in FIG. 1A. In particular, FIG. 1B depicts a process 150 that starts in step 152 where the processor, such as the processor 105, executes a communication receive instruction as part of the main program thread. This instruction directs the processor 105 to collect data from outside the processor environment.

To this end, in step 154, the processor relinquishes control of at least one of the internal registers and in step 156 the processor stops operation, typically by halting the fetching and execution of instructions in the main program thread.

The processor 105, in step 158 signals the communication interface, instructing the communication interface that the communication interface now has control of the registers that the processor relinquished control over. In step 160 the communication interface inputs data directly from the communication interface into the internal register it now has control over. To this end, as shown in FIG. 1B, the receiving unit 100, which may be for instance a microprocessor, may have an internal data connection or path that allows the communication interface to transfer data into one or more of the internal registers by way of an internal data path. This may or may not be immediately, i.e. the processor may stay in the stopped (or stalled) state until data arrives from the external device, or the comms interface times-out. The transfer of data may occur over the path 108 or via multiplexers (see 804 & 805 in FIG. 8) so it would be virtually direct. Other mechanisms may be used, such as for example tri-state buffers.

In the depicted process, the communication interface has program and/or circuit logic that allows it to determine whether the received data includes a command or other operational instruction. These are associated with incoming data and direct the data to the intended register which could be general purpose register or program counter register for example. In the depicted embodiment, the process 150 allows the external data to include a jump command that tells the communication interface to input collected data into the program counter register of the processor and to release control of the register to the processor. This release may occur straight away or it may occur after further data is transferred to other registers. This effectively acts like a jump instruction that will cause the processor to execute instructions held at the address that has been loaded into its program counter when the communications-interface releases control over the registers.

As depicted in FIG. 1B at step 164, if the communication interface program logic indicates that more data from the external device is available, then the process at step 160 is repeated. At step 164, if no more data is available, then the communications interface signals to the processor 105 that it releases control over the registers and then the processor resumes operation at step 166. Once restarted, the execution of the communication receive instruction is over in step 168 and the processor can continue executing its main program thread. It can be seen that in this process the communication receive instruction appears as within the main program thread and is executed in line with the other instructions in that thread.

Descriptions of further example embodiments according to aspects of the systems and methods described herein will now be described. Where a sending unit is shown or described the sending unit may be of any form or variation described with reference to FIG. 1A. Where a receiving unit is shown or described the receiving unit may be of any form or variation described with reference to FIG. 1A. Data sent by sending units and data received by receiving units may have similar form and may cause similar functional effects as described for such data in FIG. 1A. In many cases signals to other parts of the system (such as shared memory for example) and signals to functional blocks outside the system (such as to input output devices for example) are omitted for clarity.

Figure 2:
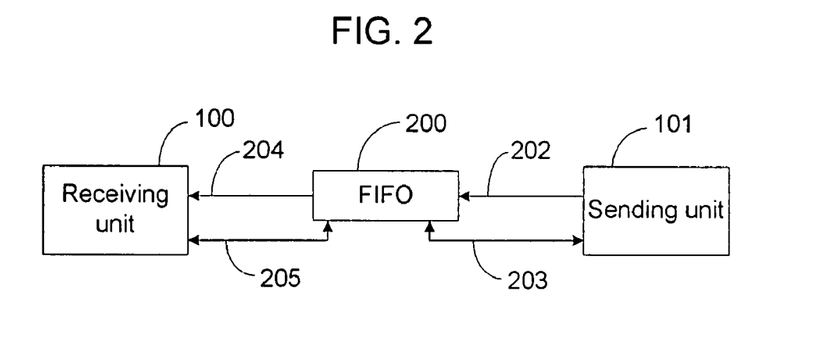
FIG. 2 shows an alternate IPC system according to the invention with a FIFO (first-in-first-out buffer)

FIG. 2 shows a further example IPC embodiment according to an aspect of the systems and methods described herein comprising a receiving unit 100, a data delay buffer shown in this example as a FIFO (first-in first-out buffer) 200 and a sending unit 101. Persons skilled in the art will know that a FIFO includes a data buffer with a plurality of data storage registers and control circuitry. The receiving unit and the sending unit are of types described for FIG. 1A with control signals 203 and 205 of similar type to control signals 103 (FIG. 1A) with additional control protocol signals to communicate with the FIFO. Examples of such additional protocol signals include signals that indicate FIFO-full and number of empty FIFO registers. Sending unit 101 sends data via signals 202 to FIFO 200 according to control signals 203. Receiving unit 100 receives data via signals 204 from the FIFO according to control signals 205. Data sent from the sending unit and received by the receiving unit may have the same form and cause the same functional effects as described for FIG. 1A. The FIFO enables the sending unit to send a sequence of data before the receiving unit is ready to make use of all the sent data. Such decoupling of the sending and receiving units maximises concurrency in a system and improves overall performance.

Figure 3:
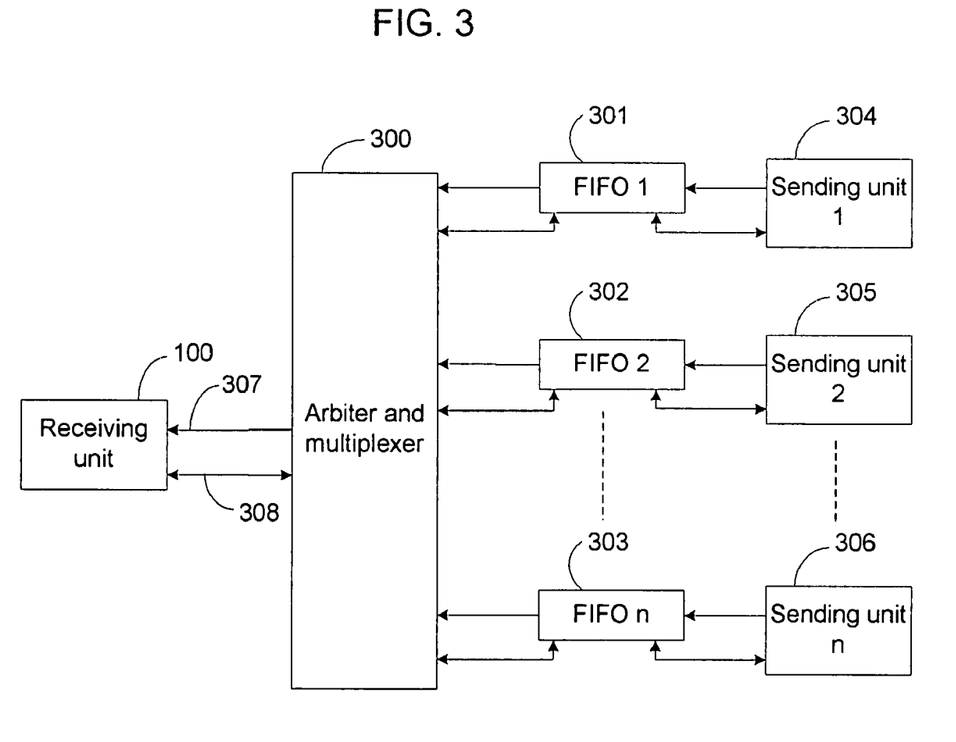
FIG. 3 shows another embodiment of an IPC system according to the invention with an arbiter and multiplexer.

FIG. 3 shows a further example IPC embodiment according to an aspect of the systems and methods described herein comprising a receiving unit 100, an arbiter and multiplexer 300, a plurality of FIFOs (301, 302 and 303 represent the fact that the number of FIFOs may be two or more), and a plurality of sending units (304, 305 and 306 represent the fact that the number of sending units may be two or more). Data and control signals to and from each FIFO function in a similar manner to those described for FIG. 2. Data signals 307 are received by receiving unit 100 according to control signals 308 where such control signals function in a similar manner to control signals 205 (FIG. 2) but may have additional control signals. Such additional control signals may for example control the nature of the arbitration and switching of the multiplexer within arbiter and multiplexer 300. Arbiter and multiplexer 300 includes an arbiter and a multiplexer where the multiplexer is controlled by the arbiter to send the data from a particular FIFO to the receiving unit. The arbitration scheme operated by the arbiter may be fixed and self-contained or may be variable and under the control of the receiving unit for example. Arbitration schemes may take the form of one or more of sending units having different priorities, data having different priorities, a time-slot sequence, first-come first-served, the receiving unit may have a plurality of communications receive commands where each communications receive command relates to a particular sending unit for example. In addition a channel lock control protocol may be implemented such that at the commencement of reception of data from a sending unit (via a FIFO), the multiplexer is inhibited from changing according to the arbitration scheme until a complete sequence of data from the said sending unit has been received.

Descriptions of example applications will now be described and for clarity where data paths are shown between sending units, receiving units, FIFOs, arbiter and multiplexers and memory, the accompanying control signals are not shown.

Figure 4:
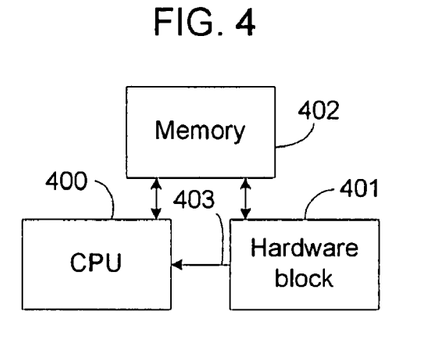
FIG. 4 shows a first example application of the IPC method according to an aspect of the invention.

FIG. 4 shows a first example application of the IPC method according to an aspect of the systems and methods described herein. Hardware block 401 operates to carryout a processing task on a portion of memory within shared memory 402 and additionally hardware block 401 includes functionality of a sending unit. Direct communication access data 403 has the same function as data 102 (FIG. 1A) such that when the hardware block completes its processing task the hardware block sends a message to CPU 400. The CPU has the same function as a receiving unit and the message from the hardware block causes the CPU to jump to a direct communications service routine that carries-out a different processing task on the memory.

Figure 5:
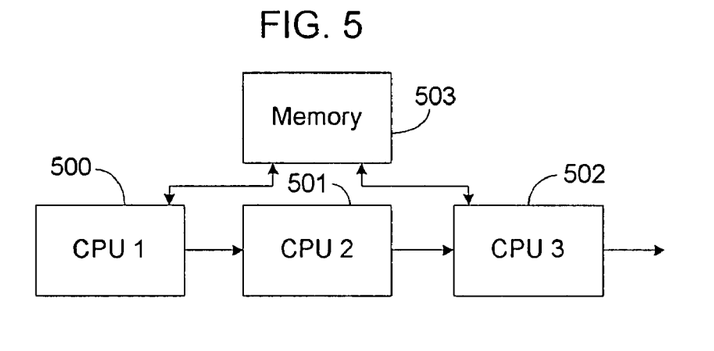
FIG. 5 shows a second example application of the IPC method according to an aspect of the invention.

FIG. 5 shows a second example application of the IPC method according to an aspect of the systems and methods described herein. CPU1 500 includes functionality of a sending unit. CPU2 501 includes functionality of a receiving unit and a sending unit. CPU3 502 includes functionality of a receiving unit and a sending unit. CPU1 processes a portion of memory in shared memory 503 then CPU1 sends a direct communications message to CPU2. CPU2 then jumps to a direct communications service routine that carries out a process on the portion of memory and then sends a direct communications message to CPU3. CPU3 then jumps to a direct communications service routine that carries out a process on the portion of memory and then sends a direct communications message to a further receiving unit (not shown).

Figure 6:
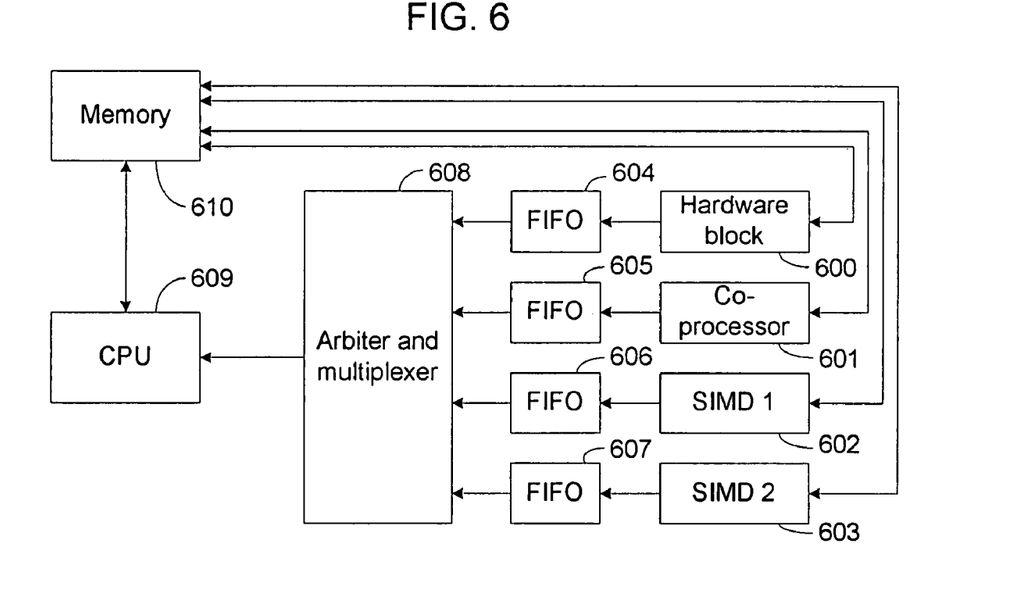
FIG. 6 shows a third example application of the IPC method according to an aspect of the invention.

FIG. 6 shows a third example application of the IPC method according to an aspect of the systems and methods described herein. This example follows the form and functionality described for FIG. 3. Hardware block 600, co-processor 601, SIMD1 602 and SIMD2 603 each also comprise sending unit functionality and each can access shared memory 610. CPU 609 functions as a receiving unit and can access shared memory 610. Hardware block 600, co-processor 601, SIMD1 602 and SIMD2 603 each independently carryout processing tasks on portions of memory within the shared memory and at the end of each task a direct communications message (comprising command and/or data) is communicated to the CPU via FIFOs 604, 605, 606 or 607 and via arbiter and multiplexer 608. When the CPU receives each direct communications message, the CPU jumps to a relevant direct communications service routine that carries out a process on a portion of memory 610.

Figure 7:
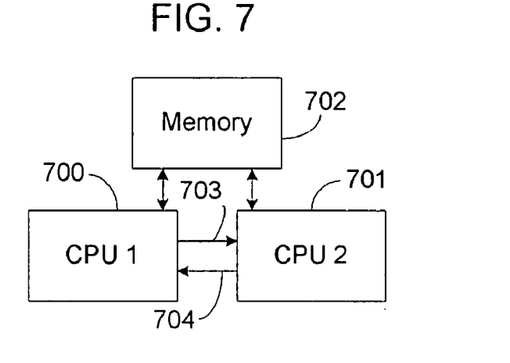
FIG. 7 shows a fourth example application of the IPC method according to an aspect of the invention.

FIG. 7 shows a fourth example application of the IPC method according to an aspect of the systems and methods described herein. CPU1 700 has the functionality of a receiving unit and a sending unit. CPU2 701 also has the functionality of a receiving unit and a sending unit. When CPU1 completes a processing task on a portion of shared memory 702, CPU1 acting as a sending unit sends a direct communications message via signals 703 to CPU2. CPU2 then jumps to a direct communications service routine that carries out a process on a portion of memory 702. At the end of the direct communications service routine, CPU2 sends a direct communications message via signals 704 to CPU1 to indicate task completion.

FIG. 8 shows a block diagram of a preferred embodiment of a receiving unit according to an aspect of the systems and methods described herein. Receiving unit 100 includes a CPU and a communications interface 107. In general the receiving unit functions according to the description of FIG. 1A and specifically the CPU includes multiplexer 804, multiplexer 805, instruction cache 806, register file 807, ALU (arithmetic and logic unit) 808, instruction decoder 809, program counter 810, load and store control 811 and data cache 812 (which in this embodiment are the equivalent to processor 105, registers 104 and memory interface 106 of FIG. 1A), and the communications interface 107 includes interface control logic 801, data control logic 802 and command decode and control logic 803.

When the CPU is executing a sequence of instructions, multiplexer 805 and multiplexer 804 are controlled so that respectively, data from ALU 808 or data cache 812 is fed to register file 807 and a signal from the instruction decoder 809 is fed to program counter 810. Persons skilled in the art will understand the general CPU operating principles and for clarity not all the CPU signal interconnections and blocks are shown and persons skilled in the art will know that additional signal paths such as branching paths may be included. Instructions are fetched from external memory (not shown) via signals 813 and data is read from or written to external memory (not shown) via signals 814. As each instruction is executed, the program counter 810 is updated so as to either point to the next sequential instruction or to point to an instruction that the program needs to jump to.

When the CPU executes a communications receive instruction, the instruction decoder has logic that signals via signal 818 to interface control logic 801 that the CPU has relinquished control over its registers to communications interface 107 (if the communications interface has not yet received externally communicated data, the instruction decoder may put itself into a stalled mode). The interface control logic is now enabled such that when a sending unit (not shown) requests, via control signals 103, to send data to the receiving unit, the interface control logic stores the data portion of the received data in data control logic 802 and the interface control logic stores the command portion of the received data in command decode and control logic 803. The communications interface now has control over the CPU's registers. If, for example, the sending unit sent an address for a direct communications service routine, then the command and decode control logic would recognise the command to load the CPU's program counter and assert signal 817 so that the instruction fetch address data on signals 815 would be routed via multiplexer 804 to load the address into the program counter 810 such that when the CPU restarts instruction execution, the CPU jumps to the address loaded by the communications interface 107. For processor architectures that employ branch prediction, the branch predictor is typically associated with fetching the instruction cache. The systems and methods described herein implements a branch from externally communicated data by directly writing to the program counter 810 and hence does not interfere with branch prediction by the processor.

If, for example, the sending unit sent data to be loaded into the CPU's working registers, then the command and decode control logic would recognise the command to load data into one of the registers in the register file and assert signal 816 so that register data on signals 815 would be routed via multiplexer 805 to the register file, and at the same time, the command decode and control logic would ensure (via signals not shown for clarity) that the correct register within the register file was being addressed. When the communications interface completes the data transfer it may accept a new communication from the sending unit. When the sending unit completes its sequence of communications to the receiving unit it sends a restart command. When the command decode and control logic receives a restart command the communications interface relinquishes control of the CPU's registers by reasserting signals 816 and 817 and by asserting a signal 819 to the instruction decoder so that the CPU restarts instruction execution. An alternative way for the communications interface to relinquish control of the CPU's registers is if the communications interface is adapted such that when the communications interface completes the data transfer it then automatically and immediately acts is if it had received a restart command. Persons skilled in the art will know that these two methods may be used in combination and/or other methods may be used by the communications interface to relinquish control of the CPU's registers.

If the sending unit wishes to send a communication to the communications interface while the CPU is executing instructions, the interface control logic stores the communicated data in the data control logic and in the command decode and control logic, but does not switch multiplexers 804 or 805. The interface control logic will signal to the sending unit via control signals 103, that the receiving unit is busy and cannot receive further communications. Then at a later time when the CPU executes a communications receive instruction, the communications interface acts upon the communicated data as described above.

When the CPU is in a stalled state (when the CPU is waiting for a sending unit to send a communication or while communications interface 107 is transferring received data via multiplexers 804 or 805), power saving may be achieved by for example de-asserting clock signals to certain CPU blocks such as for example instruction decoder 809, ALU 808, load and store control 811 and data cache 812. Persons skilled in the art will know which CPU and/or system blocks may be halted in this manner to save power. Persons skilled in the art will know that other power-saving methods may be applied to these relevant blocks such as for example disconnecting power supplies to them.

The systems and methods described herein may be employed in any suitable application. For example, a video encoder will now be described with reference to FIG. 6 where CPU 609 has additional sending unit functionality in similar manner to that shown in embodiments of FIGS. 5 and 7. CPU 609 has a separate sending unit functionality connected in each case to the hardware block 600, co-processor 601, SIMD1 602 and SIMD2 603 (each of 600-603 has in each case an additional receiving unit functionality). Hardware block 600 functions as a motion estimator. Co-processor 601 functions as an entropy encoder. SIMD! 602 and SIMD2 603 function to carry out general processing such as transforms and pixel processing. CPU 609 will run code that may be almost entirely channel receive commands, so that CPU 609 may be responsive to various interprocessor communications that make CPU 609 jump (by overwriting the program counter) to relating routines, where such routines may, after carrying out certain processing on certain data, send interprocessor communications to other receiving units, then at the end of such a routine, CPU 609 returns to operating channel receive commands. In this way, data and commands are passed around the system efficiently (without context switching or delays due to use of shared memory).

Further, although the systems described herein have been shown and described with reference to functional block diagrams, it will be understood that the functional blocks shown as separate elements may be combined with other ones of the functional blocks and incorporated into a single functional block. Additionally, it will be understood that the functional blocks illustrated may be realized as circuit logic formed on a substrate using techniques known to those of skill in the art. The logic may be hard wired or hard coded or may be user programmable and user configurable. The choice of how to provide the logic may vary according to the application being addressed.

Those skilled in the art will know or be able to ascertain using no more than routine experimentation, many equivalents to the embodiments and practices described herein. Further it will be understood that the systems and methods described herein may be employed with many types of programmable logic devices, including a CPU, microprocessor, microcontroller, single instruction multiple data (SIMD) unit, state machine, co-processor or other hardware-processing block. Accordingly, it will be understood that the invention is not to be limited to the embodiments disclosed herein, but is to be understood from the following claims, which are to be interpreted as broadly as allowed under the law.

We claim:

1. A processor system comprising:
    a processor including:
        a set of internal registers comprising at least one program counter; and
        an instruction decoder for sending a control signal responsive to execution of a predetermined instruction; and
    a communication interface coupled between the processor and an external device, the communication interface receiving data from the external device, and having at least one internal data path to at least one of the internal registers for inputting data into the at least one internal register responsive to receiving the control signal from the instruction decoder, wherein the internal data path is for directly inputting into the at least one program counter an address to a service routine by bypassing a branch prediction circuit.

2. The processor system according to claim 1, wherein the instruction decoder includes logic to perform a deactivate operation.

3. The processor system according to claim 2, wherein the instruction decoder includes logic to cease fetching instructions.

4. The processor system according to claim 1, wherein the communications interface further includes decode logic for processing the data received from the external device to detect a control command in the received data, the control command for directing operation of the communication interface.

5. The processor system according to claim 1, wherein the communication interface further comprises an internal memory for storing data received from the external device.

6. The processor system according to claim 1, wherein the communication interface includes a data delay buffer for storing data received from the external device.

7. The processor system according to claim 1, further including:
    a clock control logic for selectively deactivating the processor from continuing clocked execution.

8. A processor system according to claim 1, further comprising:
    the branch prediction circuit for performing branch prediction of instructions responsive to instructions selected during a fetch operation.

9. The processor system according to claim 1, further comprising two or more communication interfaces.

10. The processor system according to claim 1, further comprising an arbiter and a multiplexer coupled between the processor system and the external device.

11. The processor system according to claim 1, wherein the internal data path connects the processor to the communication interface and connects the communication interface to the internal register.

12. The processor system according to claim 1, wherein the internal data path comprises a bi-directional data path for allowing bi-directional transfer of data between the internal register and the communication interface.

13. The processor system according to claim 1, wherein the communication interface includes a transmitter for transmitting data to the external device.

14. The processor system of claim 1, wherein the set of internal registers further comprises a register file that represents working registers of the processor.

15. The processor system of claim 14, wherein the communication interface has at least one internal data path to the register file, the internal data path for loading data from the external device into a working register indicated in the register file.

16. The processor system of claim 15, wherein the communication interface comprises decode logic that controls whether the received data is input into the program counter or the working register based on a command included in the data received from the external device.

17. A processor system comprising:
    a first processor including:
        a set of internal registers comprising at least one program counter; and
        an instruction decoder for sending a control signal responsive to execution of a predetermined instruction;
    a second processor having a sending communication interface; and
    a communication interface coupled between the first processer and the sending communication interface of the second processor, the communication interface for receiving data from the second processor and having at least one internal data path to at least one of the internal registers for inputting data into the at least one internal register responsive to receiving the control signal from the instruction decoder, wherein the internal data path is for directly inputting into the at least one program counter an address to a service routine by bypassing a branch prediction circuit.

18. The processor system of claim 17, wherein the first processor and the second processor are arranged as a system on a chip.

19. The processor system of claim 17, wherein the second processor includes:
    a second set of internal registers;
    a second instruction decoder for sending a control signal responsive to execution of a predetermined instruction by the second processor; and
    a second communication interface for receiving data from the first processor and having an internal data path to at least one internal register in the second set for inputting data into the at least one internal register responsive to the control signal.

20. The system of claim 19, comprising a third processor, the third processing including:
    a third set of internal registers,
    a third instruction decoder for sending a control signal responsive to execution of a predetermined instruction by the third processor; and
    a third communication interface for receiving data from at least one of the first processor and second processor and having an internal data path to at least one internal register in the third set for inputting data into the at least one internal register responsive to control signal.

21. A method of a first processor system for inter-processor communications between a first processor of the first processor system and a second processor of a second processor system, the method comprising
    executing a predetermined instruction;
    sending a control signal to a communication interface coupled between the first processor system and the second processor system responsive to the execution of the predetermined instruction, the control signal indicating to control a set of registers internal to the first processor, the set of internal registers comprising at least one program counter;
receiving data from the second processor through the communication interface;
identifying an address to a service routing from the received data; and
responsive to the control signal, directly inputting the address into the at least one program counter by bypassing a branch prediction circuit of the first processor, wherein the direct input is through an internal data path provided by the communication interface that connects the communication interface to the program counter.

22. The method of claim 21, further including,
decoding the data received from the second processor to detect a control command in the data for directing operation of the communication interface.

23. The method of claim 21, further including, buffering data received from the second processor.

24. The method of claim 21, further including selectively deactivating the first processor from continuing clocked execution.

* * * * *